US008745683B1

(12) United States Patent
Maeng

(10) Patent No.: US 8,745,683 B1
(45) Date of Patent: Jun. 3, 2014

(54) METHODS, DEVICES, AND MEDIUMS ASSOCIATED WITH SUPPLEMENTARY AUDIO INFORMATION

(75) Inventor: Joon Maeng, Newcastle, WA (US)

(73) Assignee: Intellectual Ventures Fund 79 LLC, Las Vegas, NV (US)

(*) Notice: Subject to any disclaimer, the term of this patent is extended or adjusted under 35 U.S.C. 154(b) by 125 days.

(21) Appl. No.: 12/983,804

(22) Filed: Jan. 3, 2011

(51) Int. Cl.
*H04N 7/173* (2011.01)

(52) U.S. Cl.
USPC .......................................... 725/110; 725/131

(58) Field of Classification Search
None
See application file for complete search history.

(56) References Cited

U.S. PATENT DOCUMENTS

| | | | | |
|---|---|---|---|---|
| 5,572,260 A * | 11/1996 | Onishi et al. | ................ | 348/460 |
| 5,602,598 A * | 2/1997 | Shintani | ........................ | 348/565 |
| 6,338,059 B1 * | 1/2002 | Fields et al. | ................... | 715/208 |
| 7,725,447 B2 | 5/2010 | Subramaniam et al. | | |
| 7,730,405 B2 | 6/2010 | Gulli et al. | | |
| 8,151,301 B2 | 4/2012 | Bennett | | |
| 2002/0067428 A1 * | 6/2002 | Thomsen | ...................... | 348/465 |
| 2003/0051252 A1 * | 3/2003 | Miyaoku et al. | ............. | 725/109 |
| 2003/0066085 A1 | 4/2003 | Boyer et al. | | |
| 2004/0181755 A1 * | 9/2004 | Murata et al. | ................ | 715/526 |
| 2006/0149813 A1 | 7/2006 | Janik | | |
| 2007/0067268 A1 * | 3/2007 | Dai et al. | .......................... | 707/3 |
| 2007/0162850 A1 | 7/2007 | Adler et al. | | |
| 2007/0300249 A1 * | 12/2007 | Smith et al. | ..................... | 725/19 |
| 2008/0059526 A1 * | 3/2008 | Murakoshi | ................. | 707/104.1 |
| 2008/0183698 A1 * | 7/2008 | Messer et al. | ..................... | 707/5 |
| 2008/0204595 A1 * | 8/2008 | Rathod et al. | ................. | 348/465 |
| 2008/0281579 A1 * | 11/2008 | Tsukiji et al. | ..................... | 704/3 |
| 2010/0153831 A1 | 6/2010 | Beaton | | |
| 2010/0211636 A1 | 8/2010 | Starkenburg | | |
| 2011/0209177 A1 | 8/2011 | Sela et al. | | |
| 2011/0321095 A1 | 12/2011 | Yao et al. | | |

FOREIGN PATENT DOCUMENTS

JP 2004213832 A * 7/2004

OTHER PUBLICATIONS

Samsung, "The Wonder of Samsung Smart TVs", http://www.samsung.com/us/article/the-wonder-of-samsung-smart-tvs, downloaded Apr. 6, 2011, 5 pages.
Panasonic Consumer Electronics Company, "Panasonic Announces Availability of its First VIERA Cast Web-Enabled Plasma HDTV", Secaucus, New Jersey, May 20, 2008, 4 pages.
MHEG, "Information Technology—Coding of Multimedia and Hypermedia Information—Part 7: Interoperability and Conformance Testing for MHEG-5", ISO/IEC JTC 1/SC 29, Sep. 22, 1998, 73 pages.
Stolowitz Ford Cowger, LLP, "Listing of Related Cases", Sep. 7, 2011, 1 page.

* cited by examiner

*Primary Examiner* — Nathan Flynn
*Assistant Examiner* — William J Kim
(74) *Attorney, Agent, or Firm* — Stolowitz Ford Cowger LLP

(57) ABSTRACT

Media data may include audio content and video content. Text may be associated with the audio content and presented on a display device. In response to receiving a selected portion of the text, supplementary information associated with the selected portion of text may be provided to a user. A method, device, or medium may be associated with identifying the selected portion of text and providing the supplementary information.

48 Claims, 9 Drawing Sheets

METHODS, DEVICES, AND MEDIUMS ASSOCIATED WITH SUPPLEMENTARY AUDIO INFORMATION

BACKGROUND

Known media devices, such as televisions, may receive programming or broadcast media which may be presented to a user. The known media device may present the broadcast media as a video output and an audio output via a display and via one or more speakers, respectively. The user may have an option of displaying a text version of the audio output on the display, which may include a spoken portion of the broadcast media. The displayed text version of the audio output is known as closed captioning.

The closed captioning may be displayed by the media device in place of, or in addition to, the audio output. The known media devices may be configured to provide closed captioning for the benefit of users who are, for example, deaf or hearing impaired.

DETAILED DESCRIPTION

People may watch a video or a broadcast program using a variety of different media devices, such as a television, a computer, or a smart-phone. While watching the video, the viewer may listen to an audio output associated with the video. The audio output may include spoken words associated with the video. For example, the audio output may comprise dialogue associated with one or more actors in the video, a commentary made during a sporting event or other type of live event, a newscast, a talk show, a voice-over for a documentary, or the like, or any combination thereof.

The viewer may watch the video with captioning. For example, the viewer may be deaf, may be hearing impaired, may speak a primary language which is different than the language associated with the audio output, or the like. The captioning may comprise closed captioning or open captioning. Closed captioning may be available upon demand, and in one example, the captioning may be viewed by viewers who request the related captioning service. Closed captioning may be encoded into the video. The captioning may be decoded in response to a receipt of a request for service.

Open captioning may be available to all viewers of the associated video, and in one example, the captioning may be provided to the viewers without a request for the related captioning service. Open captioning may be hardcoded into the video. In one example, the captioning may comprise subtitles.

Captioning may comprise dialogue and on-screen text associated with the video. Captioning also may comprise non-spoken information including a designation of a speaker, a description of the type of language or the manner of speaking, an indication of music or sound effects associated with the audio content, or the like, or any combination thereof.

In one example, captioning may comprise information transcribed by a human operator or provided by speech-to-text software and/or apparatus during a live broadcast. The captioning also may be associated with a scripted conversation or a predetermined dialogue, which may be associated with a transcript. In one example, captioning may be prepared in advance of a video broadcast. One or more streams of captioning may be encoded into the video, for example, in what may be known to those of ordinary skill in the art as "line 21" of a vertical blanking interval.

The video may include information of interest to the viewer. For example, during a baseball game a sports announcer may mention a famous baseball player and the name of the baseball player may appear in the captioning. The viewer may perform an Internet search to obtain additional information associated with the baseball player, such as batting statistics associated with the baseball player. In another example, a viewer watching a non-English language movie may use an appropriate non-English language dictionary to translate a word associated with the audio data.

Figure 1:
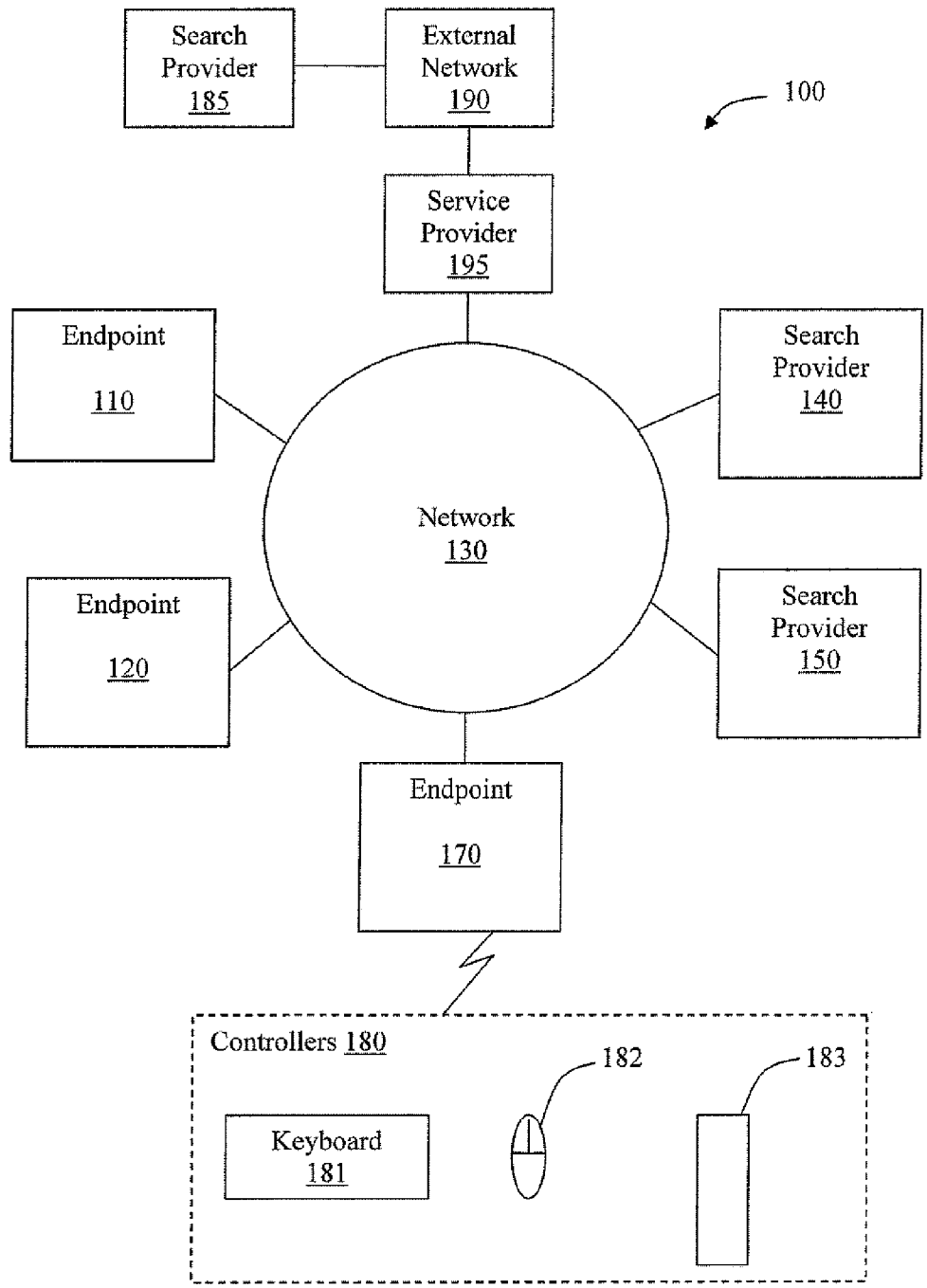
FIG. 1 depicts a block diagram of a system configured to distribute media data.

FIG. 1 depicts a block diagram of a system 100 configured to distribute media data. A plurality of endpoints, such as an endpoint 110, an endpoint 120, and an endpoint 170, may be operatively coupled to a network 130. Network 130 may be a public network, such as the Internet, or a private network, and may be established for personal use, business use, or any combination thereof. In one example, network 130 may be a wired network, a wireless network, or any combination thereof.

Network 130 may be operatively coupled to a service provider 195. In one example, network 130 may comprise a media provider network associated with customer nodes or endpoints. Network 130 also may be operatively coupled to one or more search providers, such as a search provider 140 and a search provider 150. Endpoint 170 may be configured to communicate with, or request information from, at least one of search provider 140 and/or search provider 150.

Service provider 195 may comprise a media service provider, such as a cable network provider, a satellite network provider, a cellular network provider, a telephone network provider, a broadband network provider, or the like, or any combination thereof. Service provider 195 may be operatively coupled to an external network 190. External network 190 may comprise a private intranet or a public network, such as the Internet. External network 190 may comprise a network associated with or operated by service provider 195. Service provider 195 may be configured to communicate with, or request information from, a search provider 185 via external network 190.

Endpoint 170 may be associated with one or more controllers 180. In one example, endpoint 170 may comprise a television set, a computer, a smart-phone, a home entertainment apparatus, a gaming system, a media player, a customer premise node, a set-top box, or the like, or any combination thereof. Endpoint 170 may monitor and record user operations associated with controllers 180.

Controllers 180 may include a keyboard 181, a pointing device 182, e.g., a mouse, a remote controller 183, or the like, or any combination thereof. Controllers 180 may be configured to control endpoint 170, to communicate with or request information from service provider 195, and/or to communicate with or request information from one or more search providers, such as search provider 140 and search provider 150. Controllers 180 may be configured to communicate with endpoint 170 via wired or wireless communications, such as via Ethernet, infrared, radio wave, cellular, optical, BLUETOOTH (registered trademark), WI-FI (registered trademark), other types of communication signals and networks, or any combination thereof.

Figure 2:
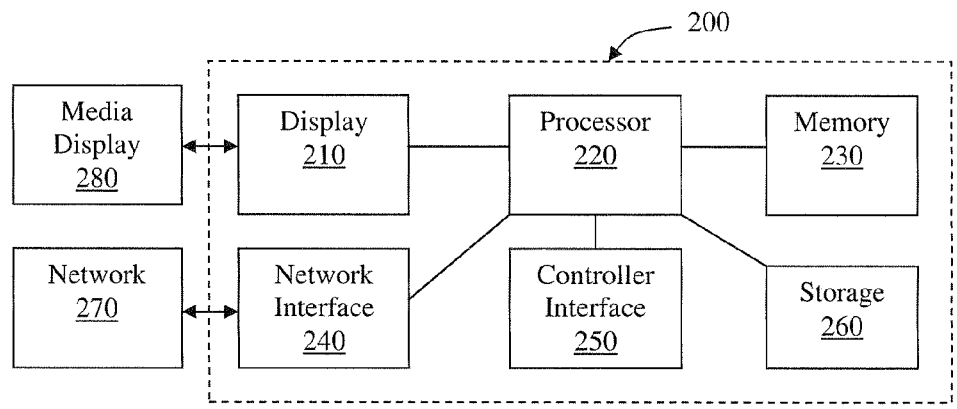
FIG. 2 depicts an example of an apparatus configured to process media data.

FIG. 2 depicts an example of an apparatus 200 configured to process media data. Apparatus 200 may comprise a processing device 220 operatively coupled to a memory 230, a storage 260, a controller interface 250, a network interface 240, and a display 210. Display 210 may comprise a display that identifies the operational status of apparatus 200. Network interface 240 may comprise electronic circuits or programs configured to interface or communicate with a network 270, such as a wired network, a wireless network, or any combination thereof. Network 270 also may comprise, or be operatively coupled to, an external network, such as external network 190 (FIG. 1).

Controller interface 250 may provide apparatus 200 with an interface to one or more controllers, such as controllers 180 (FIG. 1). The controllers may be configured to provide user control of apparatus 200. Controller interface 250 may comprise a radio transceiver or an optical transceiver for wireless communications with the controllers, or may communicate via a cable or wired communication, or any combination thereof. One or more of memory 230 and storage 260 may be configured to store instructions associated with an application program.

Processing device 220 may be configured to execute stored instructions. Processing device 220 may access memory 230 and/or storage 260 to run, store, and archive one or more programs. Memory 230 and/or storage 260 may comprise RAM, ROM, or other types of storage or memory devices.

Apparatus 200 may interface with media display 280. Processing device 220 may be configured to manage and to control video, audio, or other media content played out on media display 280. Processing device 220 also may be configured to receive input or commands from a user via controller interface 250 and one or more controllers. Communication to the user may be provided by displaying information on display 210 and/or media display 280. In one example, media display 280 may comprise a television, a monitor, a smart-phone, a plasma screen, a LCD screen, a projection screen, or the like, or any combination thereof. Media display 280 may be configured to display media in addition to the operational status or other types of media system information.

In one example, apparatus 200 may comprise a set-top box or stand alone device. In another example, apparatus 200 may be an integral part of a television or a multi-media processing apparatus.

Figure 3:
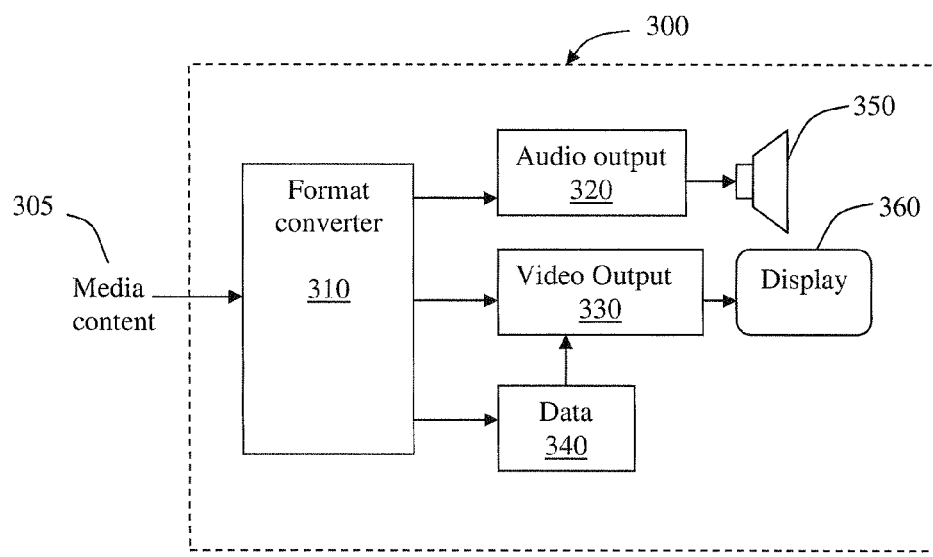
FIG. 3 depicts an example of an apparatus configured to convert media content into audio data and video data.

FIG. 3 depicts an example of an apparatus 300 configured to convert media content 305 into audio data and video data. Apparatus 300 may comprise a format converter 310 configured to convert media content into an audio output 320, a video output 330, and a data output 340. In one example, format converter 310 may comprise a decoder. Media content 305 may be received from a service provider, such as service provider 195 (FIG. 1).

Audio output 320 may be transmitted to one or more speakers 350. In one example, audio output 320 may comprise an apparatus configured to receive audio data from format converter 310 and to transmit audio signals to one or more speakers 350. One or more speakers 350 may be configured to play out the audio signals as sound.

Video output 330 may be transmitted to a display device 360. In one example, video output 330 may comprise an apparatus configured to receive video data from format converter 350 and to transmit video signals to display device 360. Video output 330 also may be configured to receive data output 340 from format converter 310. In one example, video output 330 may be configured to superimpose data output 340 with the video signals, such that data output 340 may be displayed on display device 360. Display device 360 may be configured to display data output 340 as text together with video output 330.

In one example, media content 305 may comprise a television broadcast, a web-cast, or a video stream. Audio output 320 may comprise audio or sound recordings associated with the television broadcast, and video output 330 may comprise images or a video recording associated with the television broadcast. In one example, data output 340 may comprise captioning or subtitles associated with the television broadcast.

One or more formats may be used to transmit, display, or process media content 305. For example, media content 305 may comprise NTSC, PAL HDTV, MPEG, AVI, WMV, FLV, MHEG, other formats or the like, or any combination thereof. Apparatus 300 may comprise a television set, a computer, a smart-phone, a home entertainment apparatus, a gaming system, a media player, a customer premise node, a set-top box, or the like, or any combination thereof.

Figure 4:
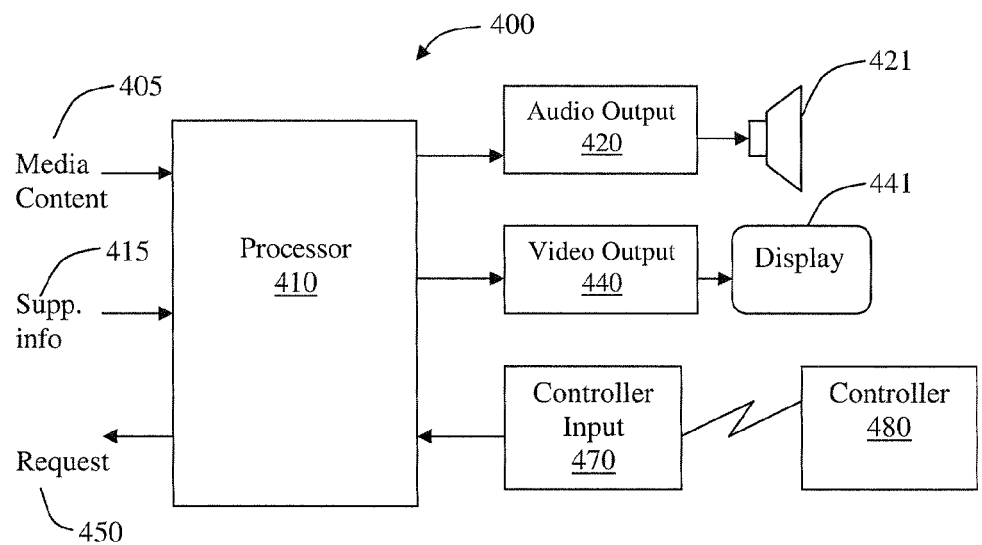
FIG. 4 depicts an example of a system configured to process media data and display supplementary information.

FIG. 4 depicts an example of a system 400 configured to process media data and to display supplementary information. Apparatus 400 may comprise a processing device 410 configured to convert media content 405 into an audio output 420 and a video output 440. In one example, processing device 410 may comprise a decoder.

Media content 405 may comprise a television program, a recorded program, a video, a live feed, a digital image, an animation, streaming video, audio media, a web-cast, or the like, or any combination thereof. Media content 405 may be provided by a media provider, may be stored locally on apparatus 400, such as in a storage or memory device, may be stored on a portable media device, such as a disk, a flash drive, a memory card, or the like, or any combination thereof.

Audio output 420 may be transmitted to one or more speakers 421. In one example, audio output 420 may comprise an apparatus configured to receive audio data from processing device 410 and to transmit audio signals to one or more speakers 421. Video output 440 may be transmitted to a display device 441. In one example, video output 440 may comprise an apparatus configured to receive video data from processing device 410 and to transmit video signals to display device 441.

Apparatus 400 may comprise, or receive, a controller input 470. Controller input 470 may be provided by a controller 480, such as a remote control, a keyboard, an optical pointing device, or the like, or any combination thereof. Controller 480 may be operatively coupled to apparatus 400 via wired or wireless communications, such as via Ethernet, infrared, radio wave, cellular, optical, BLUETOOTH (registered trademark), WI-FI (registered trademark), other types of communication signals and networks, or the like, or any combination thereof.

Controller input 470 may comprise a signal, or a device configured to receive a signal, transmitted by controller 480. The signal may comprise, or be associated with, a request, a command, an instruction, a selection, a data packet, or the like, or any combination thereof, which may be processed by processing device 410.

In one example, controller input 470 may be associated with a request for supplemental or supplementary information. Processing device 410 may be configured to process or to generate the request and to provide supplementary information 415 in response to receiving the request. Supplementary information 415 may be displayed on display device 441 and/or played out on one or more speakers 421.

In one example, processing device 410 may be configured to transmit a request 450 to a data source or a search provider. Processing device 410 also may be configured to receive supplementary information 415 from the search provider in response to transmitting request 450. The search provider may be selected from a list of available search providers or data sources that may be user-selectable.

Apparatus 400 may comprise a television set, a computer, a smart-phone, a home entertainment apparatus, a gaming system, a media player, a customer premise node, a set-top box, or the like, or any combination thereof. In one example, controller 480 may be configured to operate apparatus 400 and/or display device 441.

Media content 405 may comprise video content and audio content. Display device 441 may be configured to display the video content. Processing device 410 may be configured to identify a selected portion of text associated with the audio content. The text may represent a spoken dialogue of the audio content. Processing device 410 also may be configured to determine supplementary information 415 associated with the selected portion of text. The text and/or the supplementary information 415 may be displayed on display device 441.

Controller 480 may be configured to identify and/or to transmit a selected type of information from a user-selectable list. In one example, the supplementary information may be determined according to the selected type of information. The selected type of information may comprise a uniform resource locator, a website, a search engine, a directory, a data source, a type of language, a media provider, a service provider, a company name, a data format, or the like, or any combination thereof.

In one example, processing device 410 may receive a request to scroll through the text. The request may be received from controller 480. A first word of the text may be highlighted prior to receiving the request. In response to receiving the request, a second word of the text may be highlighted, in which the selected portion of text may comprise the second word. The selected portion of text may be indicated by highlighting at least one word of the text.

Figure 5:
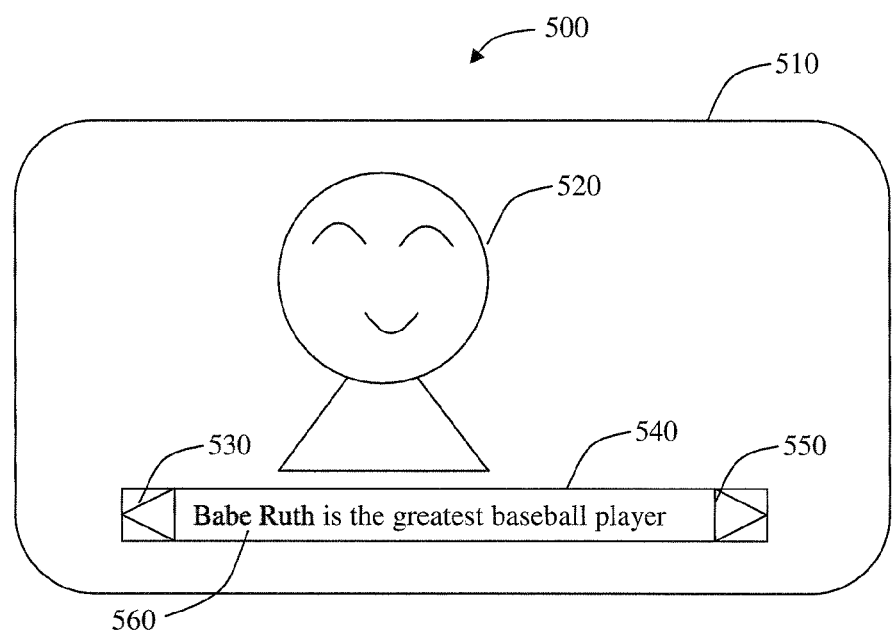
FIG. 5 depicts an example of an apparatus displaying text associated with audio data.

FIG. 5 depicts an example of an apparatus 500 displaying text 540 associated with audio data. Apparatus 500 may be configured to display media content 510, and text 540 may comprise a dialogue, a subtitle, or a captioning associated with media content 510. Media content 510 may comprise a television program, a motion picture, a recorded program, a video, a live feed, a digital image, animation, other types of media or the like, or any combination thereof.

Apparatus 500 may comprise a television, a computer, a monitor, a smart-phone, a plasma screen, a LCD screen, a projection screen, other types of displays or the like, or any combination thereof. In one example, apparatus 500 may comprise a display or media display, such as display 210 or media display 280, as depicted in FIG. 2.

In one example, media content 510 may comprise a television program, or the like, such as a baseball game. A narrator 520, such as a sports commentator, may provide dialogue comparing the batting average of a current batter with a legendary baseball player such as Babe Ruth. Text 540 associated with the dialogue may be presented or displayed on apparatus 500 as the narrator 520 speaks, or after a time delay. In other examples, narrator 520 may comprise an actor, a news anchor, a reporter, a public figure, a sports figure, a spokesperson, a talk show host, a celebrity, a singer, a voice-over, an animated character, a person, or the like, or any combination thereof.

Text 540 may be included as data content in a video stream comprising media content 510. In one example, text 540 may be generated based on a speech-to-text operation or apparatus which may be configured to convert the dialogue associated with narrator 520 into text 540.

Text 540 may comprise a plurality of words. At least one word in text 540 may be highlighted, such as by being underlined, placed in bold, changed to a different color, a different size, or a different font, or the like, or any combination thereof. Highlighted words may indicate a user-selectable word. In one example, a portion of text 540, such as portion 560, may be highlighted in response to being selected.

Text 540 may be presented in a text box. Text 540 may be associated with one or more navigation buttons such as a left navigation button 530 and a right navigation button 550. The navigation buttons may be displayed on apparatus 500, or may comprise buttons on a controller, such as one or more of controllers 180 (FIG. 1). The text box may display a plurality of words spoken over a time period, which may comprise a number of seconds. Left navigation button 530 may be configured to select a word spoken near or at the beginning of the time period, and right navigation button 550 may be configured to select a word spoken near or at the end of the time period.

In one example, left navigation button 530 may be configured to display text associated with words spoken during a first time period preceding the time period associated with text 540. Right navigation button 550 may be configured to display text associated with words spoken during a second time period following the time period associated with text 540. Apparatus 500 may be configured to store audio content and/or text 540 for an amount of time, such as a few minutes to a plurality of hours. In one example, apparatus 500 may retrieve text associated with dialogue spoken during a plurality of time periods.

Media content 510 may be provided as streaming media from a media provider or from a service provider. Media content 510 may comprise data broadcast from the media provider to a plurality of subscribers or customer end nodes. Media content 510 also may be received by the plurality of subscribers substantially at the same time, such as in a television broadcast, a live performance, an event being simulcast, or the like. In one example, media content 510 may be received continuously by the subscribers over the duration of a broadcast, a performance, an event, or the like. Media content 510 may be pre-recorded or comprise a motion picture broadcast to the plurality of customers from the media provider. Media content 510 also may be processed by a processing device located at the customer premise.

Figure 6:
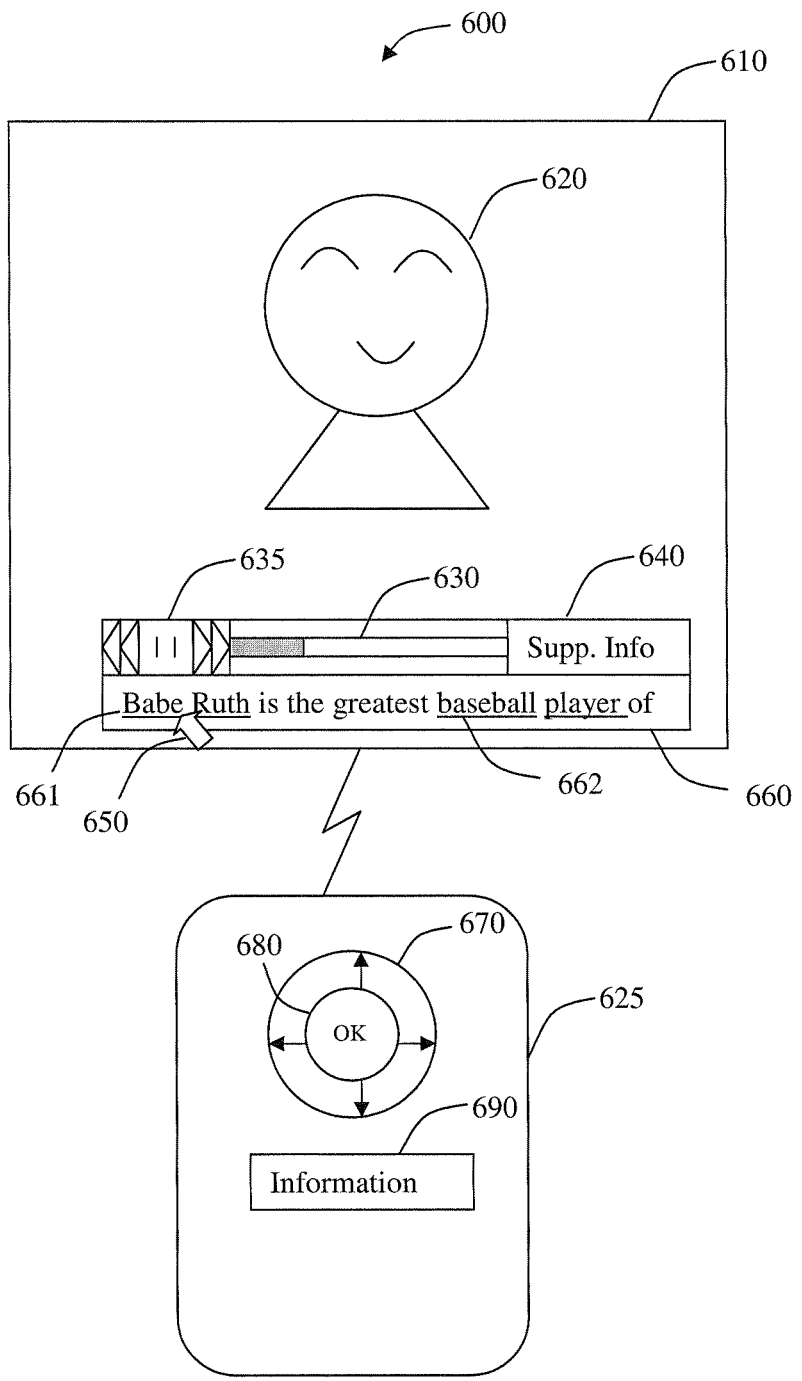
FIG. 6 depicts an example of an apparatus configured to identify a selection of a portion of text associated with audio data.

FIG. 6 depicts an example of an apparatus 600 configured to identify a selection of a portion of text associated with audio data. Apparatus 600 may be configured to display a text box 660, one or more control buttons 635, a progress bar 630, and a supplementary information object 640. Text box 660 may include text corresponding with a dialogue spoken by a narrator 620 associated with a media content 610.

A pointing device 650 may be configured to control, to designate, or to select one or more of text box 660, control buttons 635, progress bar 630, and supplementary information object 640. Pointing device 650 may be controlled by one or more controllers, such as a controller 625. Pointing device 650 may comprise a computer-generated graphical icon or cursor, or the like, or may be an optical pointing device, such as an LED pointer or a laser pointer, or any combination thereof. In one example, apparatus 600 may comprise a media display configured with optical receptors that detect light transmitted from pointing device 650 in order to identify a selected portion of text based on the position of the light on apparatus 600.

Apparatus 600 may detect movement of pointing device 650, for example, as controller 625 may be manipulated by a user. Text box 660 may be displayed as a result of the detected movement. Otherwise, text box 660 may not be visible, or may become dimmed, when apparatus 600 fails to detect any movement of pointing device 650 for a predetermined amount of time. Similarly, pointing device 650 may become visible or invisible according to the detected operation, or absence of operation, of controller 625.

Supplementary information object 640 may be displayed by apparatus 600 to alert the user of an availability of text box 660 for selection. Supplementary information object 640 may be displayed in a corner of apparatus 600, for example, or as a flashing light on controller 625. Apparatus 600 may be configured to display text box 660 in response to a selection of supplementary information object 640 by pointing device 650.

Pointing device 650 may be configured to select a portion of text associated with text box 660. A request for supplementary information may be generated in response to receiving or identifying a selection of the portion of text. In one example, text in text box 660 may be displayed in a stationary or static format which remains unchanged as media content 610 continues to play. Text box 660 may comprise text that corresponds to dialogue spoken during, or prior to, the generation of the request for supplementary information. The text may remain stationary until the selection of a portion of text, or until a predetermined amount of time has passed. In one example, text box 660 may disappear in response to the passage of the predetermined amount of time.

Control buttons 635 may be configured to navigate text displayed in text box 660. The text may be stored in a memory or buffer and associated with a time period. In one example, the text may be retrieved by navigating through the text box with control buttons 635 and selecting the portion of text with pointing device 650. Progress bar 630 may demonstrate or indicate a relative position of the text during the time period.

Controller 625 may comprise navigation controls 670, a selection button 680, and an information button 690. Navigation controls 670 may be configured to manipulate or control a position of pointing device 650. In one example, navigation controls 670 may be configured to highlight different portions of the text.

The portion of text may be selected by pressing selection button 680. The selected portion of text may comprise at least one word which may be highlighted or otherwise designated as being selected. The portion of text may be selected by pressing selection button 680 with pointing device 650 located generally over one or more words associated with text box 660.

In one example, a first portion 661 of text may comprise the words "Babe Ruth." Supplementary information associated with first portion 661 of text may be displayed or presented in response to a selection of first portion 661 of text. A second portion 662 of text may comprise the word "baseball." The viewer may select second portion 662 of text by navigating within text box 660 using control buttons 635 and/or navigation controls 670, and pressing selection button 680. Supplementary information associated with second portion 662 of text may be displayed or presented in response to a selection of second portion 662 of text.

Apparatus 600 may be configured to identify significant or key words in text box 660. Key words may be user-selectable. In one example, words which are not identified as key words may be ignored or disabled for user selection. Non-key words may comprise words such as prepositions, conjunctions, articles, conditionals, determiners, modals, or the like, or any combination thereof. In one example, non-key words may be stored in a database and/or memory. Navigation within text box 660 may ignore or skip over non-key words, such that non-key words may be non-selectable.

In one example, any or all words in text box 660 may be selected. A user may obtain a translation of any word appearing in text box 660. A user may select a portion of text for translation into a different language. A first set of words may be displayed by text box 660. When a user navigates to either end of text box 660, the first set of words may be replaced with a second set of words.

In one example, apparatus 600 may comprise a memory device configured to store instructions associated with an application program. Apparatus 600 also may comprise a processing device that, in response to executing the instructions stored in the memory device, may be configured to process media content, such as media content 610, comprising video data and audio data.

Apparatus 600 may be configured to cause the video data to be displayed on a display device. Apparatus 600 also may be configured to cause text associated with the audio data to be displayed on the display device. The text may be displayed in a text box, such as text box 660. In one example, apparatus 600 may identify a selection of at least one portion of the text, and may cause supplementary information associated with the selected at least one portion to be displayed on the display device. Apparatus 600 also may be configured to transmit a request for the supplementary information, and the request may comprise the selected at least one portion. The request may be transmitted to a data source, such as a search provider, a search engine, a service provider, an on-line dictionary, a website on the World Wide Web, or the like, or any combination thereof. In one example, the data source may be embedded in the video data or video stream.

Apparatus 600 may be configured to cause a user-selectable list of different types of information to be displayed on the display device. Apparatus 600 also may be configured to receive a selected type of information from the user-selectable list, and the supplementary information may be displayed corresponding to the selected type of information. The user-selectable list of different types of information may be associated with, or correspond to, different spoken languages or to different search providers, for example.

The text may be displayed on the display device together with the video data. In one example, the video data may comprise streaming video, and the audio data may comprise a spoken dialogue of the streaming video. Apparatus 600 may be configured to pause the video data in response to receiving a request for supplementary information. Apparatus 600 also may be configured to buffer the text for a predetermined amount of time associated with a portion of the audio data. In one example, apparatus 600 may be configured to scroll through the text responsive to receiving a request to scroll through the text.

In one example, apparatus 600 may comprise a computer and a pointing device, such as a mouse. The computer may be configured to play a digital video from a web page. Icons or equivalent features in the computer display may perform functions similar to those discussed above with respect to control buttons 635, navigation controls 670, selection button 680, information button 690, or the like, or any combination thereof.

In one example, the portion of text may become highlighted in response to pointing device 650 passing over one or more words in text box 660. Placing pointing device 650 over, or in proximity to, the portion of text, or using pointing device 650 to select, e.g., click, the portion of text may result in the portion of text being selected. The portion of text may be selected by a key-stroke or numerical selection on a controller.

Figure 7:
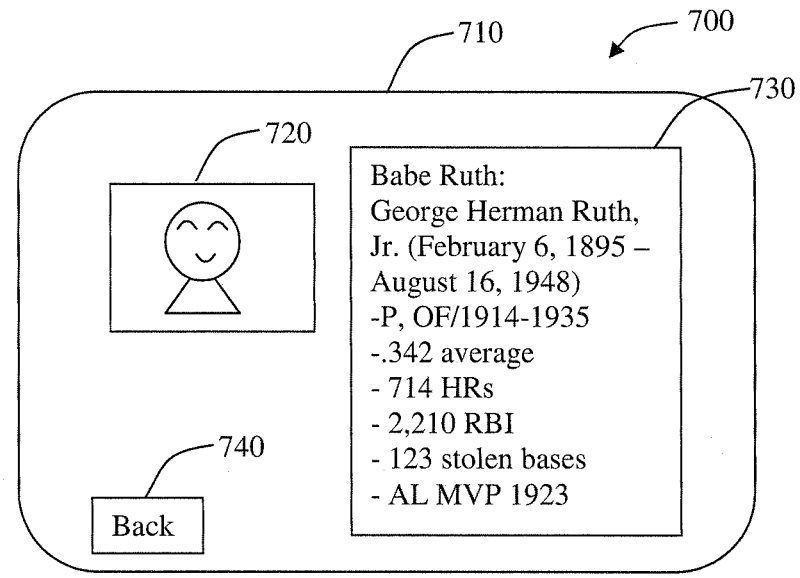
FIG. 7 depicts an example of an apparatus displaying supplementary information.

FIG. 7 depicts an example of an apparatus 700 displaying supplementary information 730. In one example, supplementary information 730 may be displayed or presented in response to a selection of a portion of text, or the like, such as a portion of text associated with text box 660 (FIG. 6). Apparatus 700 may be configured to cause a video 720 to be displayed in a first window associated with a display device 710. Video 720 may comprise a television program, a recorded program, a video, a web-cast, a live feed, a digital image, animation, audio media, or the like, or any combination thereof. Apparatus 700 also may be configured to cause supplementary information 730 to be displayed in a second window associated with display device 710. Supplementary information 730 may be displayed concurrently with video 720.

Either of the first window or the second window may be a relatively smaller window which overlays supplementary information 730 or video 720, respectively. For example, the first window and the second window may be oriented as a picture-in-picture mode of operation. In another example, video 720 and supplementary information 730 may be displayed as split screens on display device 710. In yet another example, the display of video 720 may be replaced with supplementary information 730 on display device 710. Instead of, or in addition to, displaying the supplementary information 730 on display device 710, supplementary information 730 may be caused to be played out as audio content. Display device 710 may comprise a television, a monitor, a smart-phone, a plasma screen, a LCD screen, a projection screen, other types of display or the like, or any combination thereof.

In one example, apparatus 700 may comprise a back button 740 which may be configured to return the image being displayed to a default mode of operation comprising video 720 without displaying supplementary information 730. For example, selection of back button 740 may result in display device 710 displaying a full size image of video 720.

An image of video 720 may be temporarily paused in response to displaying supplementary information 730. The image may be paused in response to receiving a user input. For example, the user input may comprise the selection of a portion of text, such as a portion of text associated with text box 660 (FIG. 6). Pausing the image may allow for the user to review supplementary information 730 without missing any of video 720 that would otherwise be played. Video 720 may continue to play from the point that the video 720 was paused in response to apparatus 700 receiving a further command from the user, or after timing out. In the case of a live feed or streaming media, the playback of video 720 may be delayed after the pause. For example, video 720 may be temporarily stored while being paused, and then played from memory in a delayed state of playback which follows receipt of the streaming media.

Video 720 may be received from a first data source, and supplementary information 730 may be received from a second data source. For example, one or both of the first and second data sources may comprise a media provider, a media player, a live video feed, a processing device, a database, a media storage device, a website, a search engine, or the like, or any combination thereof. In one example, apparatus 700 may be configured to cause a list of data providers to be displayed, and the search results may be requested from a selected data provider, such as an Internet search engine.

Figure 8:
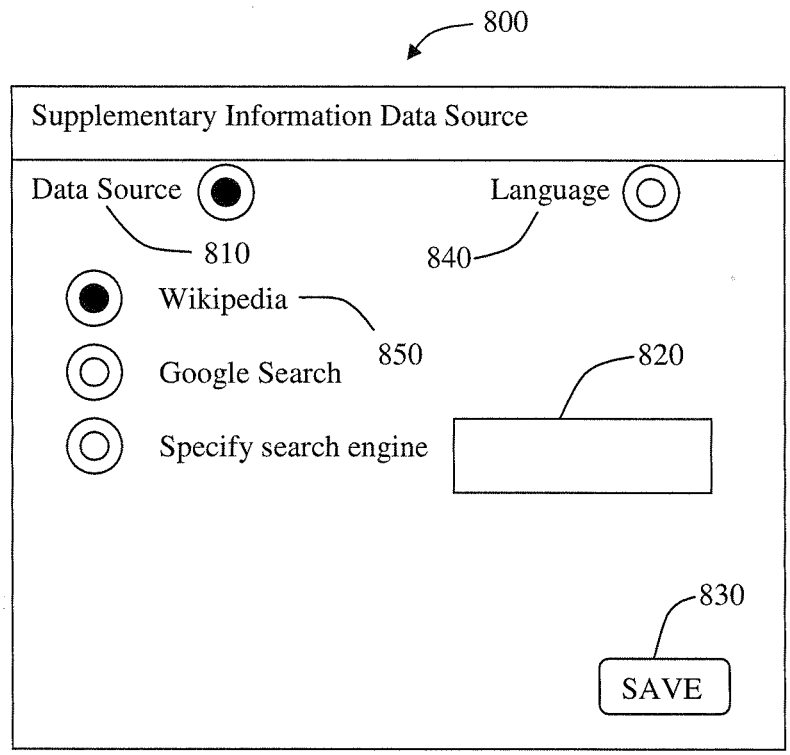
FIG. 8 depicts an example of a configuration tool for selecting a data provider.

FIG. 8 depicts an example of a configuration tool 800 for selecting a data provider 810. Configuration tool 800 may be configured to provide a list of choices 850 for selecting sources of information or search engines. A default selection may be provided as a factory setting. A user may change data provider 810 to a different data source or specify a new data source in a data provider box 820. For example, the Uniform Resource Locator (URL) for the new data source may be typed or otherwise entered into data provider box 820. The selection of data provider 810 may be saved 830 as a default or custom setting.

The media system may obtain supplementary information from data provider 810 in response to the selection of data provider 810. In one example, the selection of data provider 810 may be received prior to receipt of the video associated with the selected portion of text. The selection of data provider 810 may be completed during a configuration mode of operation, or as part of an order or request for services from a service provider. In one example, configuration tool 800 may be displayed the first time the user requests supplementary information.

Configuration tool 800 also may be configured to allow selection of a language 840. Supplementary information associated with a selected portion of text may be displayed in the selected language 840. For example, the supplementary information may provide a translation of the selected portion of text into language 840. A default selection of language 840 may be provided as a factory setting, for example, based on a designated country of a computer operating system.

Figure 9:
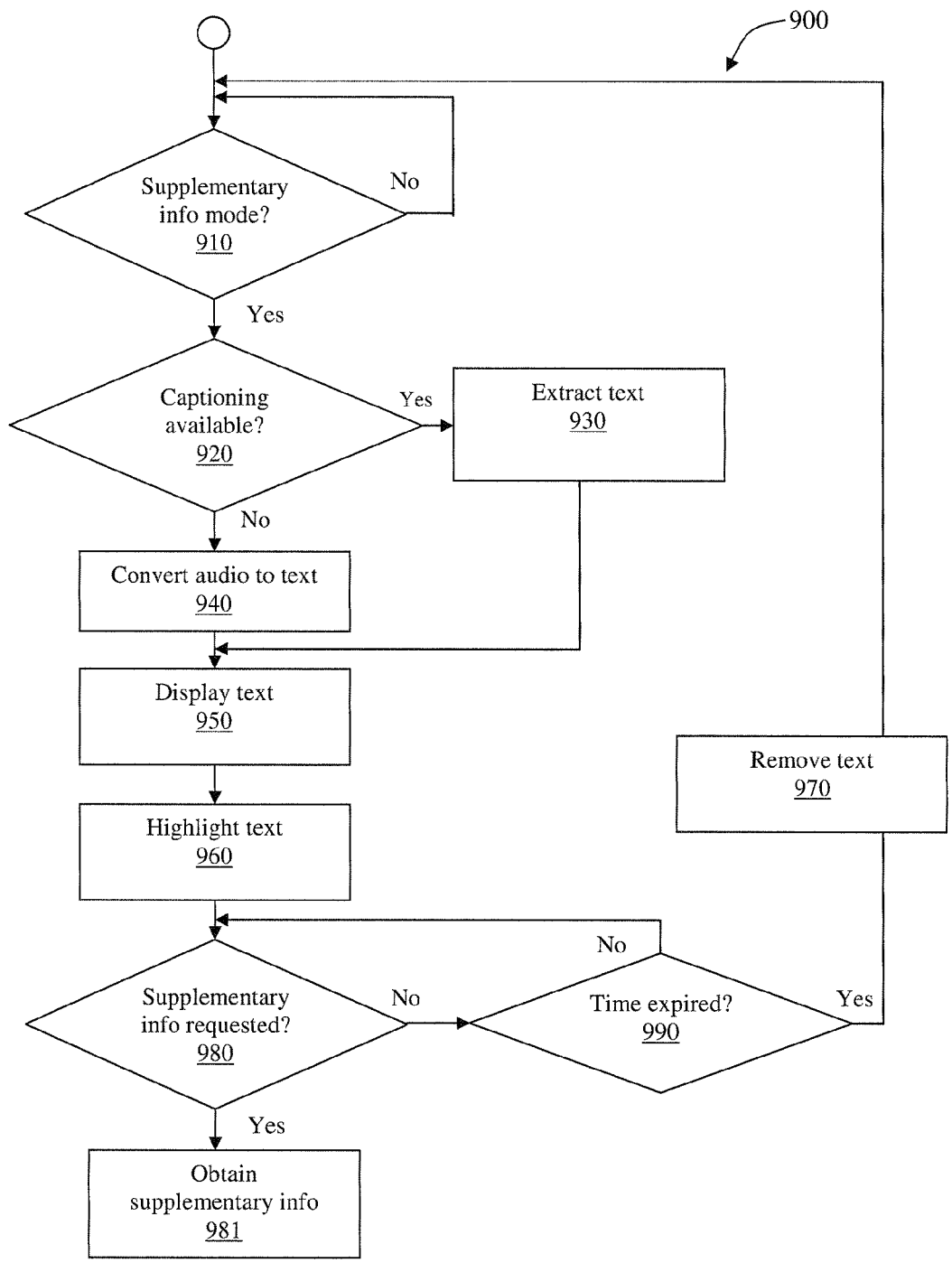
FIG. 9 depicts an example of a process for obtaining supplementary information associated with audio content.

FIG. 9 depicts an example of a process 900 for obtaining supplementary information associated with audio content. At operation 910, a mode of operation associated with a video may be evaluated or monitored. Process 900 may progress to operation 920 in response to detecting a supplementary information mode of operation.

At operation 920, the video may be evaluated to determine the presence of captioning. Process 900 may progress to operation 930 in response to detecting the presence of captioning. Text may be extracted from the captioning at operation 930. Process 900 may progress to operation 940 in response to detecting the absence or unavailability of captioning.

At operation 940, the audio portion of the video may be converted to text. In one example, the audio portion may be converted to text by a speech-to-text conversion program, software, apparatus, or the like, or any combination thereof. The audio and/or captioning may be stored or buffered for an amount of time. In one example, the audio portion may be converted to text in response to detecting the supplementary information mode of operation. The stored audio and/or captioning may be converted to text.

At operation 950, the text may be displayed. A portion of the text may be associated with links to provide supplementary information. At operation 960, significant or key words of the text may be identified. In one example, the portion of text may be highlighted. The portion of text may comprise the key words.

At operation 980, the text may be monitored to determine if a portion of the text has been selected. Supplementary information associated with the selected portion of text may be obtained and may be displayed at operation 981 in response to detecting the selected portion of text. At operation 990, absent any detection of the selected portion of text, process 990 may return to operation 980 pending a selection of a portion of text. After a predetermined amount of time, process 900 may progress to operation 970. At operation 970, the text may be removed. Following operation 970, process 900 may return to operation 910.

Process 900 depicted by FIG. 9 and the associated operations may be performed by one or more processing devices, such as processing device 410 (FIG. 4). In one example, a service provider, such as service provider 195 (FIG. 1), may be configured to distribute the video to one or more customer nodes or endpoints. The video may be distributed as streaming video. The one or more endpoints may comprise a distributed network of user devices configured to receive and play the media content.

In one example, the processing device may comprise a computer or television set. In another example, the processing device may comprise a video head-end or a server in computer network configured to process the request to obtain the supplementary information. A display device may be configured to pass remote control inputs (keystrokes) to the head-end device and/or server, and the head-end device and/or server may be configured to provide supplementary information via the display device. In one example, operations of process 900 may be performed by any combination of the computer, the television, the head-end, and/or the server.

Figure 10:
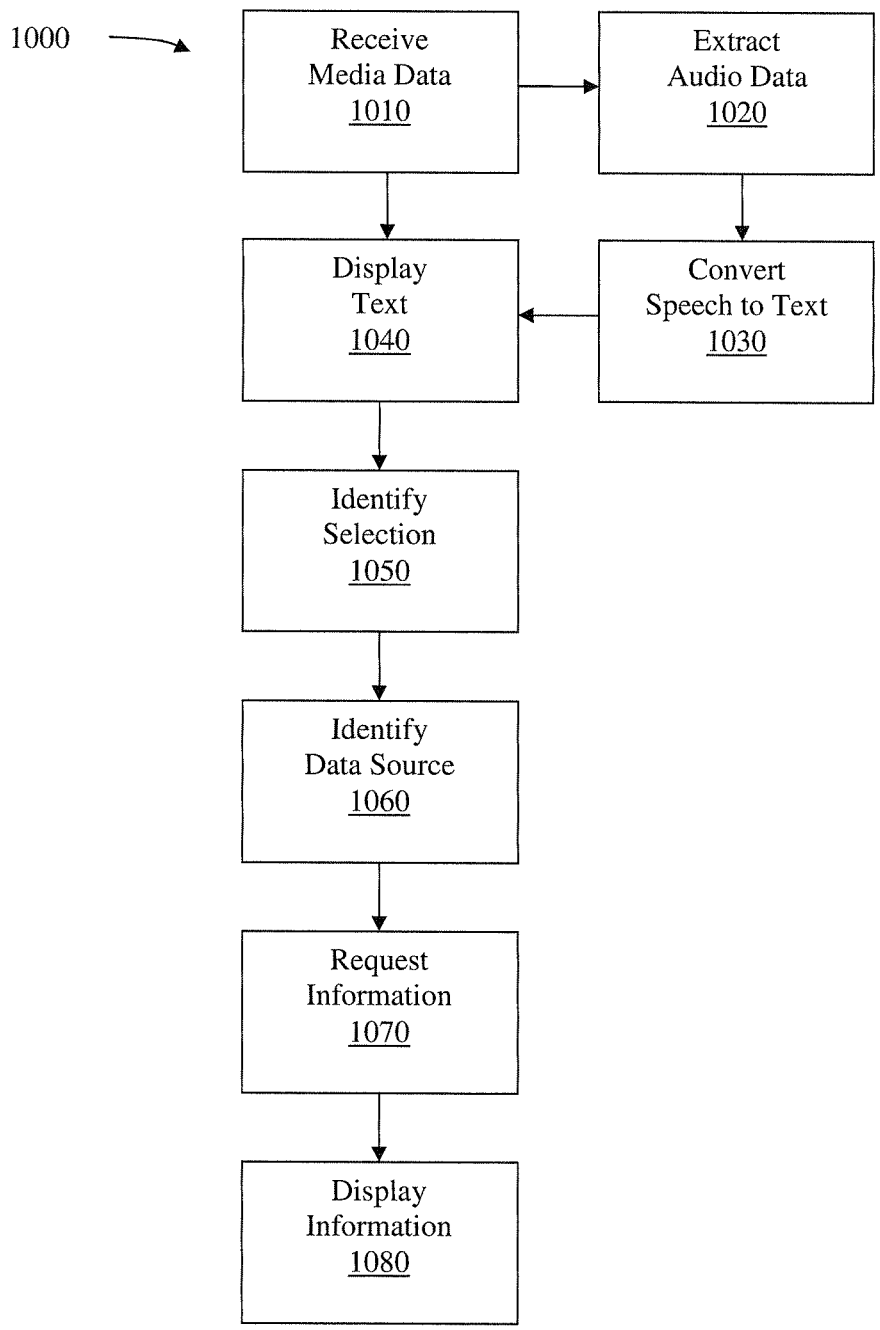
FIG. 10 depicts an example of a process for obtaining supplementary information associated with a selected portion of displayed text.

FIG. 10 depicts an example of a process 1000 for obtaining supplementary information associated with a selected portion of displayed text. At operation 1010, media data may be received. Media data may comprise audio data and video data. The video data may be displayed on a display device.

At operation 1020, the media data may be processed to extract the audio data. At operation 1030, the audio data may be converted into text. In one example, the audio data may be converted into text using a speech-to-text program, software, apparatus, or the like, or any combination thereof.

At operation 1040, text corresponding to the audio data may be displayed on the display device. In one example, the text may comprise captioning, such as closed captioning. Responsive to receiving a request for supplementary information, the text may be temporarily paused so that the text remains unchanged. In one example, the playing of video data may be paused in response to receiving the request for supplementary information.

At operation 1050, a selection of at least one portion of the text may be identified. The selected portion of text may comprise one or more words of the text. In one example, a command to scroll through the text may be received prior to the selection of the at least one portion of the text. The text may be stored in a buffer for a predetermined amount of time, and the command to scroll may operate to scroll through the text within the predetermined amount of time.

Key words in the text may be highlighted. The selected at least one portion of the text may comprise at least one of the key words. In one example, the key words in the text may be distinguished from non-key words in the text. Identifying the selection may comprise ignoring each non-key word included in the selected at least one portion of the text.

At operation 1060, a data source may be identified. The data source may be identified based on a user-selection of the data source. At operation 1070, supplementary information may be requested from the data source. At operation 1080, the supplementary information associated with the selected at least one portion of the text may be displayed on the display device.

Process 1000 depicted by FIG. 10 and the associated operations may be performed by one or more processing devices, such as processing device 410 (FIG. 4). In one example, a service provider, such as service provider 195 (FIG. 1), may be configured to distribute the video to one or more customer nodes or endpoints. The video may be distributed as streaming video. The one or more endpoints may comprise a distributed network of user devices configured to receive and play the media content.

In one example, the processing device may comprise a computer or television set. In another example, the processing device may comprise a video head-end or a server in computer network configured to process the request to obtain the supplementary information. A display device may be configured to pass remote control inputs (keystrokes) to the head-end device and/or server, and the head-end device and/or server may be configured to provide supplementary information via the display device. In one example, operations of process 1000 may be performed by any combination of the computer, the television, the head-end, and/or the server.

Figure 11:
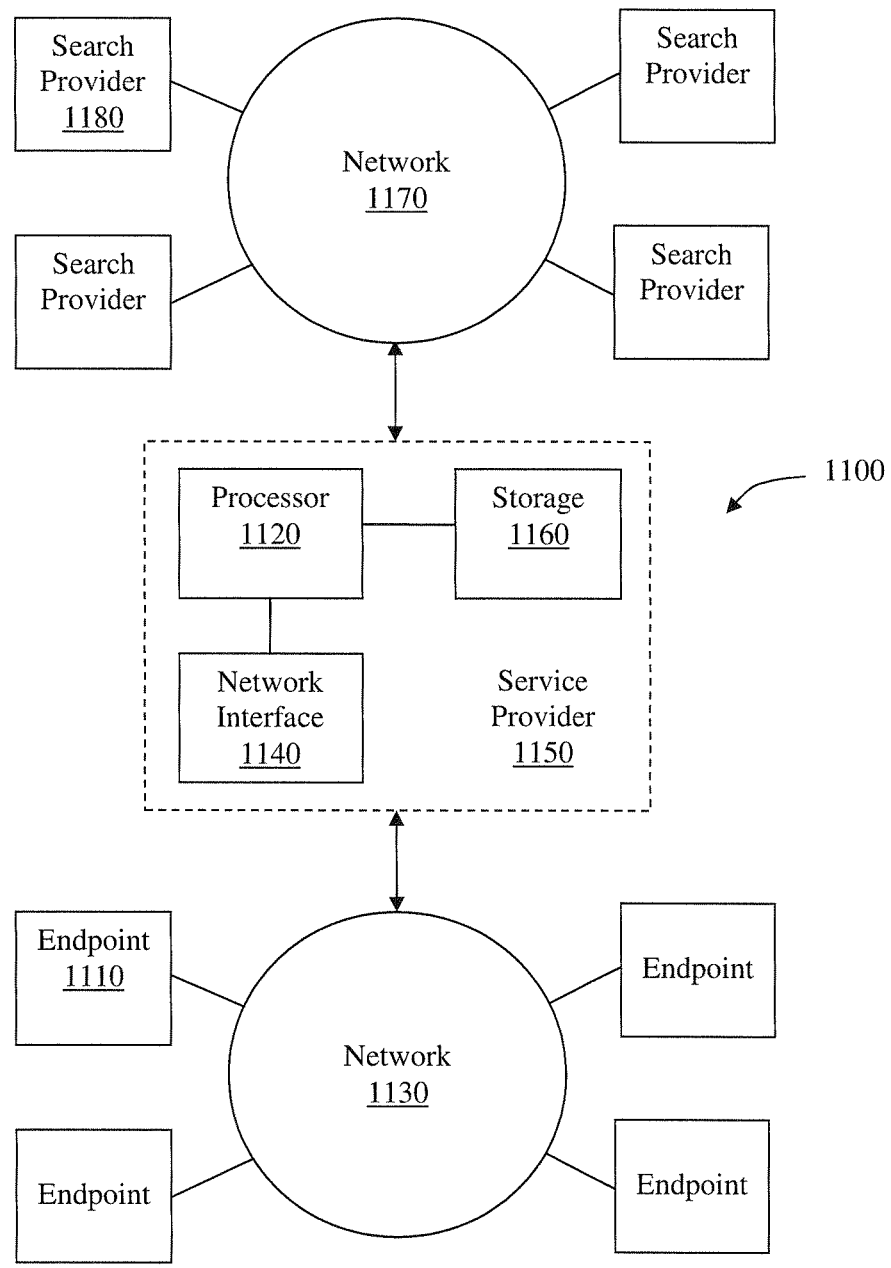
FIG. 11 depicts an example of a system comprising a media provider.

FIG. 11 depicts an example of a system 1100 comprising a service provider 1150. Service provider 1150 may comprise one or more network interfaces 1140 configured to interface with a first network 1130. First network 1130 may operatively couple one or more endpoints comprising an endpoint 1110, with service provider 1150. First network 1130 may comprise a media provider's network, such as a cable network, a satellite network, a cellular network, a telephone network, a broadband network, other types of networks or the like, or any combination thereof. Network interface 1140 may comprise a router, a gateway, a modem, or the like, or any combination thereof, configured to operatively couple service provider 1150 to first network 1130.

Service provider 1150 may be configured to distribute media to one or more endpoints, such as endpoint 1110. The distributed media may comprise video, such as streaming video. In one example, the distributed media may comprise video content and audio content. Service provider 1150 may receive a request for supplementary information from endpoint 1110. The data request may indicate a portion of text associated with the audio content. Responsive to receiving the request, service provider 1150 may transmit supplementary information to endpoint 1110. In one example, the supplementary information may be transmitted to endpoint 1110 separately from the media content.

The selected portion of text may comprise at least one word of a first language. The supplementary information may comprise a translation of the at least one word into a second language. In one example, the supplementary information may comprise a definition of the selected portion of text. In another example, the supplementary information may comprise historical information associated with the selected portion of text. In yet another example, the supplementary information may comprise statistical data associated with the selected portion of text.

The supplementary information may be stored in one or more memory devices 1160. Service provider 1150 may be configured to associate the selected portion of text with the stored information, and identify the information based on the association. Service provider 1150 may further be configured to perform an Internet search for the supplementary information. Service provider 1150 may comprise one or more processing devices 1120 configured to process or perform operations. Instructions for performing the operations may be stored in one or more memory devices 1160. One or more processing devices 1120 may be configured to execute the instructions.

One or more network interfaces 1140 may be configured to interface with a second network 1170. Second network 1170 may comprise a private network of databases or search engines. Second network 1170 may comprise a public network, such as the Internet. In one example, service provider 1150 may be configured to request the supplementary information from search provider 1180 associated with second network 1170. The search provider 1180 may comprise a third party search engine or data source designated or requested by endpoint 1110.

In one example, service provider 1150 may be configured to operate as a router, a gateway, or an interface between first network 1130 and second network 1170. Endpoint 1110 may request the supplementary information from search provider 1180 after service provider 1150 routes the request.

Figure 12:
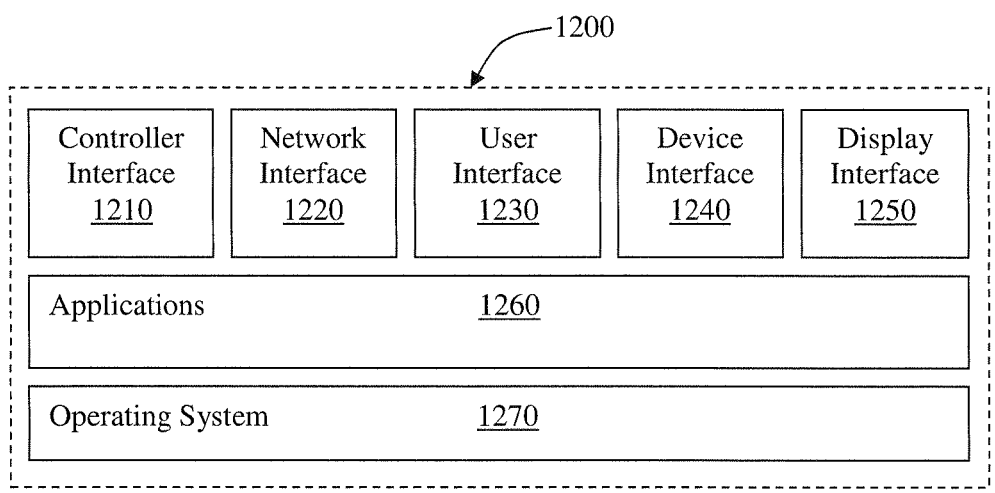
FIG. 12 depicts a block diagram of an example system comprising operation modules configured for operation with a media processor.

FIG. 12 depicts a block diagram of an example system 1200 comprising operation modules configured for operation with a media processor. System 1200 may comprise a controller interface 1210, a network interface 1220, a user interface 1230, a device interface 1240, a display interface 1250, applications 1260, and an operating system 1270.

Controller interface 1210 may be configured to interact with one or more controllers, such as controllers 180 of FIG. 1. Network interface 1220 may be configured to manage interfaces with one or more networks, such as network 130 and external network 190 of FIG. 1. User interface 1230 may be configured to control the features of a display device or apparatus, such as apparatus 500, apparatus 600, or apparatus 700 as depicted in FIGS. 5, 6, and 7, respectively.

Device interface 1240 may be configured to communicate with one or more devices. Display interface 1250 may be configured to present information to a display device, such as media display 280 of FIG. 2 or display device 710 of FIG. 7. Applications 1260 may include instructions for, or be configured to, process media, provide supplementary information, perform other functions or the like, or any combination thereof.

System 1200 may be configured to provide or present supplementary information for one or more scenes of a video based on the associated audio. System 1200 also may be configured to obtain text from captioning associated with, or extract text from, the audio in the video, to identify significant or key words in the text, and to display the text. A viewer may select a portion of the text to request supplementary information. In one example, system 1200 may be configured to obtain the supplementary information associated with the selected portion of text from a specified source.

In one example, system 1200 may comprise a computer-readable memory device having instructions stored thereon that, in response to execution by a processing device, may cause the processing device to perform operations. The operations may include processing media data comprising video content and audio content, displaying the video content on a display device, displaying text associated with the audio content on the display device, identifying a selected portion of the text, and displaying supplementary information associated with the selected portion of the text on the display device.

The text may comprise a plurality of words, and the selected portion of the text may comprise at least one word of the plurality of words. The text may comprise open captioning or closed captioning. In one example, the text may comprise subtitles. In another example, the supplementary information may comprise a translation of the selected portion of the text into a different language.

The operations also may comprise identifying a preferred source of the supplementary information and requesting the supplementary information from the preferred source. The preferred source may be identified from a user-selectable list of search providers. In one example, the preferred source may be identified prior to identifying the selected portion of the text. The operations also may comprise transmitting the selected portion of the text to the preferred source as one or more search terms. In one example, the media data may comprise the supplementary information, and the operations also may comprise converting the media data into the video content, the audio content, and the supplementary information The system and apparatus described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, minicomputer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. We claim all modifications and variation coming within the spirit and scope of the following claims.

The invention claimed is:

1. A method comprising:
    processing, by a processing device, media data comprising audio data and video data;
    causing, by the processing device, the video data to be played;
    causing, by the processing device, text corresponding to the audio data to be displayed on a display device;
    receiving, from a remote control device, a first command for the display device to pause the text, wherein the paused text is associated with a current image of the video data;
    storing, by the processing device, the paused text in a buffer for a predetermined amount of time associated with at least a portion of the audio data;
    receiving, from the remote control device, a second command for the display device to scroll through the paused text;
    scrolling through the paused text within the predetermined amount of time, in response to receiving the second command, wherein scrolling through the paused text causes text corresponding to a previous image of the video data to be displayed on the display device;
    identifying, by the processing device, a selection of at least one portion of the paused text, wherein the first command for the display device is received prior to the selection of the at least one portion of the text;
    generating, by the processing device, a request for supplementary information associated with the selected at least one portion of the text;
    receiving, by the processing device, the supplementary information;
    causing, by the processing device, the supplementary information to be displayed on the display device; and
    temporarily pausing, by the processing device, the playing of the video data in response to receiving the supplementary information.

2. The method of claim 1, further comprising causing, by the processing device, the video data to be played on the display device while the text is paused.

3. The method of claim 1, wherein the text corresponding to the audio data comprises closed captioning.

4. The method of claim 1, further comprising converting, by the processing device, the audio data into the text corresponding to the audio data.

5. The method of claim 1, further comprising causing, by the processing device, key words in the paused text to be highlighted, wherein the selected at least one portion of the text comprises at least one of the key words.

6. The method of claim 5, further comprising distinguishing, by the processing device, the key words in the paused text from non-key words in the paused text, wherein identifying the selection comprises ignoring each non-key word included in the selected at least one portion of the text.

7. A computer-readable memory device having instructions stored thereon that, in response to execution by a processing device, cause the processing device to perform operations comprising:
    processing media data comprising video content and audio content;
    playing the video content on a display device;
    displaying text associated with the audio content on the display device;
    causing the text to pause on the display device in response to receiving a first user request to pause the text, wherein the paused text is associated with a current image of the video content and wherein the paused text is stored in a buffer for a predetermined amount of time associated with at least a portion of the audio content;
    causing the paused text to scroll on the display device in response to receiving a second user request to scroll through the paused text within the predetermined amount of time;
    displaying previous text corresponding to a previous image of the video content displayed on the display device in response to scrolling the paused text;
    identifying a selected portion of the previous text, wherein the user request to scroll through the paused text is received prior to identifying the selected portion of the previous text;
    generating a request for supplementary information associated with the selected portion of the previous text;
    temporarily pausing the playing of the video data in response to receiving the supplementary information; and
    displaying the supplementary information on the display device.

8. The computer-readable memory device of claim 7, wherein the text associated with the audio content comprises open captioning or closed captioning.

9. The computer-readable memory device of claim 7, wherein the text associated with the audio content comprises subtitles.

10. The computer-readable memory device of claim 7, wherein the supplementary information comprises a translation of the selected portion of the previous text into a different language.

11. The computer-readable memory device of claim 7, wherein the previous text comprises a plurality of words, and wherein the selected portion of the previous text comprises at least one word of the plurality of words.

12. The computer-readable memory device of claim 7, wherein the operations further comprise:
    identifying a preferred source of the supplementary information; and
    requesting the supplementary information from the preferred source.

13. The computer-readable memory device of claim 12, wherein the preferred source is identified from a user-selectable list of search providers.

14. The computer-readable memory device of claim 12, wherein the preferred source is identified prior to identifying the selected portion of the previous text.

15. The computer-readable memory device of claim 12, wherein the operations further comprise transmitting the selected portion of the previous text to the preferred source as one or more search terms.

16. The computer-readable memory device of claim 7, wherein the media data comprises the supplementary information, and wherein the operations further comprise converting the media data into the video content, the audio content, and the supplementary information.

17. The computer-readable memory device of claim 7, wherein the operations further comprise storing the paused text in a buffer for a predetermined amount of time, and wherein the user request causes the stored text to scroll on the display device within the predetermined amount of time.

18. The computer-readable memory device of claim 7, wherein the operations further comprise:
causing the video data to be played; and
displaying the paused text while the video data continues to be played.

19. An apparatus, comprising:
a memory device configured to store instructions associated with an application program; and
a processing device that, in response to executing the instructions stored in the memory device, is configured to:
process media content comprising video data and audio data;
cause the video data to be displayed on a display device;
cause text associated with the audio data to be displayed on the display device;
cause the text to pause on the display device in response to receiving a first command from a remote control device to pause the text, wherein the paused text is associated with a current image of the video data and wherein the paused text is stored in a buffer for a predetermined amount of time associated with at least a portion of the audio data;
cause text corresponding to a previous image of the video data to be displayed on the display device within the predetermined amount of time in response to receiving a second command from the remote control device for the display device to scroll through the paused text;
identify a selection of at least one portion of the text corresponding to the previous image of the video content, wherein the first command from the remote control device is received prior to identifying the selection of the at least one portion of the text;
generate a request for supplementary information associated with the selected at least one portion of the text corresponding to the previous image of the video content;
cause the supplementary information to be displayed on the display device; and
pause the video data in response to receiving the supplementary information.

20. The apparatus of claim 19, wherein the processing device is further configured to transmit a request for the supplementary information, and wherein the request comprises the selected at least one portion of the text corresponding to the previous image of the video content.

21. The apparatus of claim 20, wherein the request is transmitted to a search provider.

22. The apparatus of claim 19, wherein the processing device is further configured to:
cause a user-selectable list of different types of information to be displayed on the display device; and
receive a selected type of information from the user-selectable list, wherein the supplementary information is displayed corresponding to the selected type of information.

23. The apparatus of claim 22, wherein the different types of information correspond to different spoken languages.

24. The apparatus of claim 22, wherein the different types of information correspond to different search providers.

25. The apparatus of claim 19, wherein the text corresponding to the previous image of the video content is displayed on the display device together with the current image of the video data.

26. The apparatus of claim 19, wherein the video data comprises streaming video, and wherein the audio data comprises a spoken dialogue of the streaming video.

27. An apparatus, comprising:
means for processing media data comprising video content and audio content;
means for displaying the video content on a display device;
means for receiving a user request to have the means for displaying scroll through text associated with the audio content, wherein the scrolled text is stored in a buffer for a predetermined amount of time associated with at least a portion of the audio content, wherein the scrolled text comprises a first portion associated with a first image of the video content and a second portion associated with a second image of the video content, the second image being displayed after the first image, and wherein in response to the user request, the means for displaying replaces the second portion of the scrolled text with the first portion of the scrolled text within the predetermined amount of time;
means for identifying a selected portion of the scrolled text, wherein the user request is received prior to identifying the selected portion of the scrolled text, and wherein the scrolled text is displayed on the means for displaying;
means for generating a request for supplementary information associated with the selected portion of the scrolled text;
means for receiving the supplementary information, wherein the supplementary information is displayed on the means for displaying; and
means for temporarily pausing the playing of the video content in response to receiving the supplementary information associated with the request.

28. The apparatus of claim 27, further comprising:
means for receiving a selected type of information from a user-selectable list, wherein the supplementary information is determined according to the selected type of information.

29. The apparatus of claim 28, wherein the selected type of information comprises a uniform resource locator.

30. The apparatus of claim 28, wherein the selected type of information comprises a website.

31. The apparatus of claim 28, wherein the selected type of information comprises a search engine.

32. The apparatus of claim 28, wherein the selected type of information comprises a directory.

33. The apparatus of claim 27, wherein a first word of the scrolled text is highlighted prior to receiving the user request, and wherein a second word of the scrolled text is highlighted in response to receiving the user request.

34. The apparatus of claim 33, wherein the selected portion of the scrolled text comprises the second word.

35. The apparatus of claim 27, wherein the scrolled text represents a spoken dialogue of the audio content.

36. The apparatus of claim 27, further comprising means for selecting the selected portion of scrolled text, wherein the selected portion of the scrolled text is indicated by highlighting at least one word of the scrolled text.

37. The apparatus of claim 27, wherein the means for processing, the means for identifying, and the means for receiving are housed within a set-top box.

38. The apparatus of claim 27, wherein the means for processing, the means for displaying, the means for identifying, and the means for receiving are contained within a television set.

39. The apparatus of claim 27, further comprising means for buffering the scrolled text for a predetermined amount of time associated with a portion of the audio data, wherein the means for displaying comprises means for scrolling through the buffered text within the predetermined time.

40. A method, comprising:
   processing, by a processing device, media content comprising video data and audio data;
   causing, by the processing device, the video data to be displayed on a display device;
   causing, by the processing device, text associated with the audio data to be displayed on the display device;
   causing, by the processing device, the text to pause on the display device in response to receiving a first command from a remote control device to pause the text, wherein the paused text is associated with a current image of the video content and wherein the paused text is stored in a buffer for a predetermined amount of time associated with at least a portion of the audio data;
   causing, by the processing device, the paused text to scroll on the display device within the predetermined amount of time in response to receiving a second command from a remote control device for the display device to scroll through the paused text;
   causing, by the processing device, previous text corresponding to a previous image of the video content to be displayed on the display device in response to scrolling the paused text;
   identifying, by the processing device, a selection of a portion of the previous text, wherein the first command for the display device is received prior to identifying the selection of the portion of the previous text;
   receiving, by the processing device, supplementary information associated with the selected portion of the previous text;
   causing, by the processing device, the supplementary information to be displayed on the display device; and
   temporarily pausing the displayed video data in response to receiving the supplementary information.

41. The method of claim 40, wherein the selected portion of the previous text comprises at least one word of a first language, and wherein the supplementary information comprises a translation of the at least one word into a second language.

42. The method of claim 40, wherein the supplementary information comprises a definition of the selected portion of the previous text.

43. The method of claim 40, wherein the supplementary information comprises historical information associated with the selected portion of the previous text.

44. The method of claim 40, wherein the supplementary information comprises statistical data associated with the selected portion of the previous text.

45. The method of claim 40, further comprising performing an Internet search for the supplementary information.

46. The method of claim 40, further comprising:
   associating the selected portion of the previous text with the supplementary information; and
   identifying the supplementary information based on the association.

47. The method of claim 40, further comprising transmitting the supplementary information to at least one endpoint responsive to identifying the selected portion of the previous text.

48. The method of claim 40, further comprising generating a request for the supplementary information.

* * * * *